A. O. RICKETTS.
JACK.
APPLICATION FILED AUG. 25, 1911.

1,100,619.

Patented June 16, 1914.

Witnesses

Inventor
A. O. Ricketts
By
Attorneys

UNITED STATES PATENT OFFICE.

ALBERT O. RICKETTS, OF COLONA, COLORADO.

JACK.

1,100,619.  Specification of Letters Patent.  Patented June 16, 1914.

Application filed August 25, 1911. Serial No. 645,911.

*To all whom it may concern:*

Be it known that I, ALBERT O. RICKETTS, a citizen of the United States, residing at Colona, in the county of Ouray, State of Colorado, have invented certain new and useful Improvements in Jacks; and I do hereby declare the following to be a full, clear, and exact description of the invention, such as will enable others skilled in the art to which it appertains to make and use the same.

This invention relates to lifting jacks more especially adapted for use in connection with wagons or other vehicles for raising the axles thereof for any purpose whatever such as for removing the wheels and lubricating the spindles.

An object of the invention is to provide an improved device for the above purpose which will permit the raising of an axle of a vehicle in a convenient manner, the device being so constructed as to be placed under the axle to raise the same by operation of a lever forming a part of the jack and to place the wheels of the vehicle supporting the ends of the axle, upon the ground to remove all supporting pressure from the jack when the axle is lowered and thereby prevent hindrance to the removal of the jack.

Another object of the invention is the provision of a jack which comprises a few simple parts which can be conveniently attached by reason of their simple construction and which when not in use can be folded so as to be stored in a compact space.

With these and other objects in view the invention consists of certain other combinations and arrangements of parts as will be hereinafter more fully described and claimed, it being a still further object of the invention to provide a device which will not be likely to get out of working order.

Figure 1:
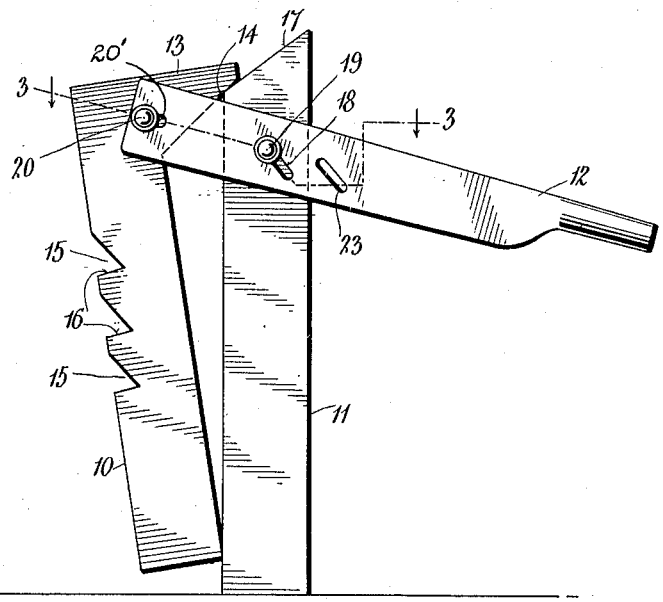
Figure 2:
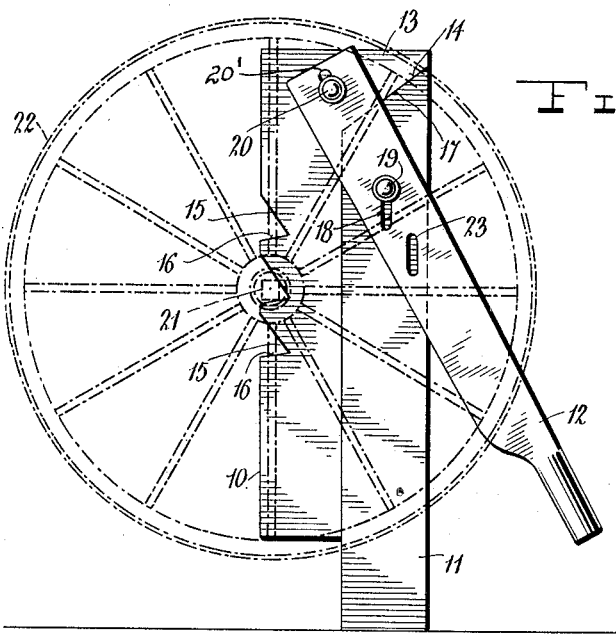
Figure 3:
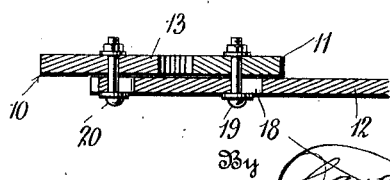

In the drawings Figure 1 is a side elevation of my improved jack, in a position to be placed under an axle of a vehicle for raising the same. Fig. 2 is a similar view but showing the device in position beneath an axle for supporting the same, a portion of a wheel being shown supported thereby in dotted lines. Fig. 3 is a sectional view on the line 3—3 of Fig. 1.

Referring to the drawings in detail, there is shown my improved jack which comprises a forward leg 10, a rear leg 11 and a lever 12, the said forward leg 10 being shorter than the leg 11 and having an enlarged head 13 formed at its upper end and provided with an inclined rear edge 14 tapering toward the leg proper, said leg when in an inoperative position being inclined forwardly and provided with a plurality of notches 15 upon its forward edge and spaced from each other so as to permit use of the device with vehicles whose axles are supported at different heights from the ground. These notches are preferably of quadrant formation and have their lower edge walls 16 slightly inclined with respect to the forward edge of the leg 10 so as to freely receive an axle and to permit the same to be readily removed therefrom when the jack is moved from an operative to an inoperative position.

The rear leg 11 which as before mentioned, is longer than the leg 10 has its upper edge beveled or inclined forwardly as shown at 17 to coact with the inclined rear edge 14 of the enlarged head 13 of the leg 10 and to form a camming surface during the operative movements of the jack as will be hereinafter described. This lever 12 is also formed with a vertical slot 18 for receiving a pivot bolt 19 of the leg 11 adjacent one end thereof and in this instance located adjacent the upper end of the leg 11 and said lever is further pivotally connected in a slot 20' as shown at 20 to the enlarged head 13 of the leg 10 so that when the parts are in the position shown in Fig. 1, the bolt 19 will be in a vertical position within the slot 18 with the jack resting upon the leg 11 and the leg 10 in a somewhat lowered position and it will be observed that the lever 12 also inclines outwardly and is supported by the leg 11 upon the ground.

When it is desired to operate the jack, it is placed beneath an axle 21 upon which wheels 22 are journaled, the said axle being engaged by one of the walls 16 according to its height. Downward pressure is then exerted upon the lever 12 to swing the enlarged head 13 in a raised position due to the sliding or camming action of the faces 14 and 17, so as to raise the leg 10 a considerable distance and support the axle upon the lever 12 and leg 11 as shown in Fig. 2 of the drawings. If desired to give greater leverage or movement to the lever 12, it may be provided with another slot 23 disposed in a similar direction above the slot 19 so that the said lever 12 will be disposed in a further raised position when the device is in the position shown in Fig. 1 of the drawings. This slot formation of the lever also permits it to fold with the leg portions of the jack storing the same in a compact space.

From the foregoing description in connection with the accompanying drawings, it will be seen that I have provided an improved jack for the purpose specified and which comprises three simple main parts, the two legs and lever respectively. It will be further observed that the formation of the parts is such as to provide greater power in use and to permit the jack to be used in connection with axles supported at various heights from the ground.

The device is simple in construction, efficient in operation, durable in use and economical to manufacture.

I claim:—

A lifting jack comprising a stationary leg having a beveled top, a movable leg having a lateral extension at its top provided on its under face with a beveled portion coacting with and resting upon the beveled face of the stationary member, a lever provided with a pair of slots and bolts passed through the slots and seated in the legs whereby rocking of the lever will cause the extension to slide on the beveled top of the stationary leg, the lower end of the movable leg sliding on the side of the stationary leg.

In testimony whereof, I affix my signature, in presence of two witnesses.

ALBERT O. RICKETTS.

Witnesses:
W. A. BERRY,
HENRY RIPLEY.

---

Copies of this patent may be obtained for five cents each, by addressing the "Commissioner of Patents, Washington, D. C."